US010553046B2

(12) United States Patent
Thron et al.

(10) Patent No.: US 10,553,046 B2
(45) Date of Patent: Feb. 4, 2020

(54) VEHICLE PROGNOSTICS AND REMEDIAL RESPONSE

(71) Applicant: GM GLOBAL TECHNOLOGY OPERATIONS LLC, Detroit, MI (US)

(72) Inventors: Esther Thron, Austin, TX (US); Wallace P. Montgomery, Austin, TX (US); Ravi P. Nudurumati, Round Rock, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 118 days.

(21) Appl. No.: 15/946,548

(22) Filed: Apr. 5, 2018

(65) Prior Publication Data

US 2019/0311556 A1 Oct. 10, 2019

(51) Int. Cl.
*G01M 17/00* (2006.01)
*G07C 5/08* (2006.01)
*G07C 5/00* (2006.01)
*G06F 15/00* (2006.01)

(52) U.S. Cl.
CPC .......... *G07C 5/0808* (2013.01); *G07C 5/008* (2013.01)

(58) Field of Classification Search
CPC ..... G07C 5/008; G07C 5/0808; G01M 17/00; G06F 15/00
USPC ........................................................ 701/31.1
See application file for complete search history.

(56) References Cited

U.S. PATENT DOCUMENTS

2016/0377462 A1* 12/2016 Ke ...................... G06F 17/5009 73/861.22
2018/0325460 A1* 11/2018 Wegerich ............ A61B 5/0205

* cited by examiner

*Primary Examiner* — Tan Q Nguyen
(74) *Attorney, Agent, or Firm* — Reising Ethington P.C.

(57) ABSTRACT

A system and method of method of carrying out a remedial action in response to a vehicle prognosis, the method including: receiving vehicle feature data from a vehicle; extracting a plurality of feature combination data from the vehicle feature data, wherein each of the feature combination data pertains to a feature combination, wherein each of the feature combinations includes two or more vehicle features; for each extracted feature combination data, then: (i) evaluating the extracted feature combination data using an anomaly detection function based on a multivariate distribution mixture model; and (ii) obtaining an anomaly detection score for each extracted feature combination based on the evaluating step; determining a vehicle subsystem that comprises a portion of vehicle electronics installed on the vehicle and that is likely experiencing a problem or unusual behavior based on the anomaly detection scores; and carrying out a remedial action in response to the determining step.

17 Claims, 4 Drawing Sheets

VEHICLE PROGNOSTICS AND REMEDIAL RESPONSE

INTRODUCTION

The present invention relates to prognostics of a vehicle and carrying out a response based on a prognosis of the vehicle.

Vehicles include hardware and software capable of obtaining and processing various information, including vehicle sensor information and diagnostic information that is obtained by vehicle subsystems and individual vehicle system modules (VSMs). Moreover, vehicles include networking capabilities and can be connected to various vehicle backend servers. The information obtained at the vehicle may be processed remotely to identify problems with the vehicle operation.

SUMMARY

According to one aspect of the invention, there is provided a method of carrying out a remedial action in response to a vehicle prognosis, the method including: receiving vehicle feature data from a vehicle; extracting a plurality of feature combination data from the vehicle feature data, wherein each of the feature combination data pertains to a feature combination, wherein each of the feature combinations includes two or more vehicle features; for each extracted feature combination data, then: (i) evaluating the extracted feature combination data using an anomaly detection function configured particularly for the feature combination, wherein the anomaly detection function is based on a multivariate distribution mixture model; and (ii) obtaining an anomaly detection score for each extracted feature combination based on the evaluating step; determining a vehicle subsystem that comprises a portion of vehicle electronics installed on the vehicle and that is likely experiencing a problem or unusual behavior based on the anomaly detection scores; and carrying out a remedial action in response to the determining step.

According to various embodiments, this method may further include any one of the following features or any technically-feasible combination of some or all of these features:

- the vehicle feature data is vehicle sensor data, and wherein the vehicle feature data is obtained at the vehicle through use of a plurality of onboard vehicle sensors;
- the onboard vehicle sensors are connected to a wireless communications device via a communications bus, and wherein the wireless communications device is used to send the vehicle feature data to a remote facility;
- generating a plurality of multivariate mixture models for each possible feature combination of a particular class of vehicles, wherein the multivariate mixture model used in the evaluating step is one of the plurality of multivariate mixture models, and wherein the vehicle is included in the particular class of vehicles;
- the multivariate mixture model is a bivariate Gaussian mixture model that includes a plurality of mixture components;
- each of the anomaly detection functions are based on a different multivariate mixture model, wherein each of the different multivariate mixture models are generated for a particular feature combination;

- a first one of the plurality of feature combinations includes two vehicle features and wherein the first feature combination is associated with a bivariate Gaussian mixture model;
- a second one of the plurality of feature combinations includes three vehicle features and wherein the second feature combination is associated with a trivariate Gaussian mixture model;
- the remedial action includes sending a warning message to the vehicle; and/or
- the remedial action includes sending a vehicle command to the vehicle that causes the vehicle to automatically carry out a vehicle function pursuant to the vehicle command.

According to another aspect of the invention, there is provided a method of carrying out a remedial action in response to a vehicle prognosis, the method including: receiving vehicle feature data from a vehicle, wherein the vehicle feature data includes data for a plurality of vehicle features, and wherein each of the vehicle features are associated with an onboard vehicle sensor; extracting a plurality of feature combination data from the vehicle feature data, wherein each of the feature combination data includes data pertaining to two or more vehicle features; for each extracted feature combination data, obtaining an anomaly detection score for each extracted feature combination based on the evaluating step, wherein the anomaly detection scores are each determined by: (i) obtaining an anomaly detection function for a given feature combination, wherein the anomaly detection function is based on a multivariate distribution model that is specifically generated for the feature combination; and (ii) calculating the anomaly detection score based on the anomaly detection function and the extracted feature combination data; determining a vehicle subsystem that comprises a portion of vehicle electronics installed on the vehicle and that is likely experiencing a problem or unusual behavior based on the anomaly detection scores; and carrying out a remedial action in response to the determining step.

According to various embodiments, this method may further include any one of the following features or any technically-feasible combination of some or all of these features:

- generating the anomaly detection function;
- the generating step includes modelling a set of training data for each feature combination of a particular type of vehicle, wherein the modelling includes using a multivariate Gaussian mixture model to obtain a feature combination mixture model that includes one or more mixture components;
- the anomaly detection function is a negative log likelihood function;
- the determining step is carried out based on selecting one or more feature combinations that are associated with top anomaly detection scores;
- one or more vehicle features included in the one or more selected feature combinations are analyzed to determine which vehicle subsystem is experiencing or is likely experiencing abnormal behavior or problematic behavior; and/or
- the remedial action is particularly tailored for the vehicle subsystem.

According to yet another aspect of the invention, there is provided a remote vehicle prognosis and remediation system, including: a server that includes a processor and computer-readable memory, the computer-readable memory storing a computer program; and a vehicle prognostics database that stores vehicle telemetry information including a plurality of anomaly detection functions; wherein the computer program, when executed by the processor, causes the server to: receive vehicle feature data from a vehicle; extract a plurality of feature combination data from the vehicle feature data, wherein each of the feature combination data pertains to a feature combination, wherein each of the feature combinations includes two or more vehicle features; for each extracted feature combination data, then: (i) evaluate the extracted feature combination data using an anomaly detection function configured particularly for the feature combination, wherein the anomaly detection function is based on a multivariate mixture model; and (ii) obtain an anomaly detection score for each extracted feature combination based on the evaluating step; determine a vehicle subsystem that comprises a portion of vehicle electronics installed on the vehicle and that is likely experiencing a problem or unusual behavior based on the anomaly detection scores; and carry out a remedial action in response to the determining step.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
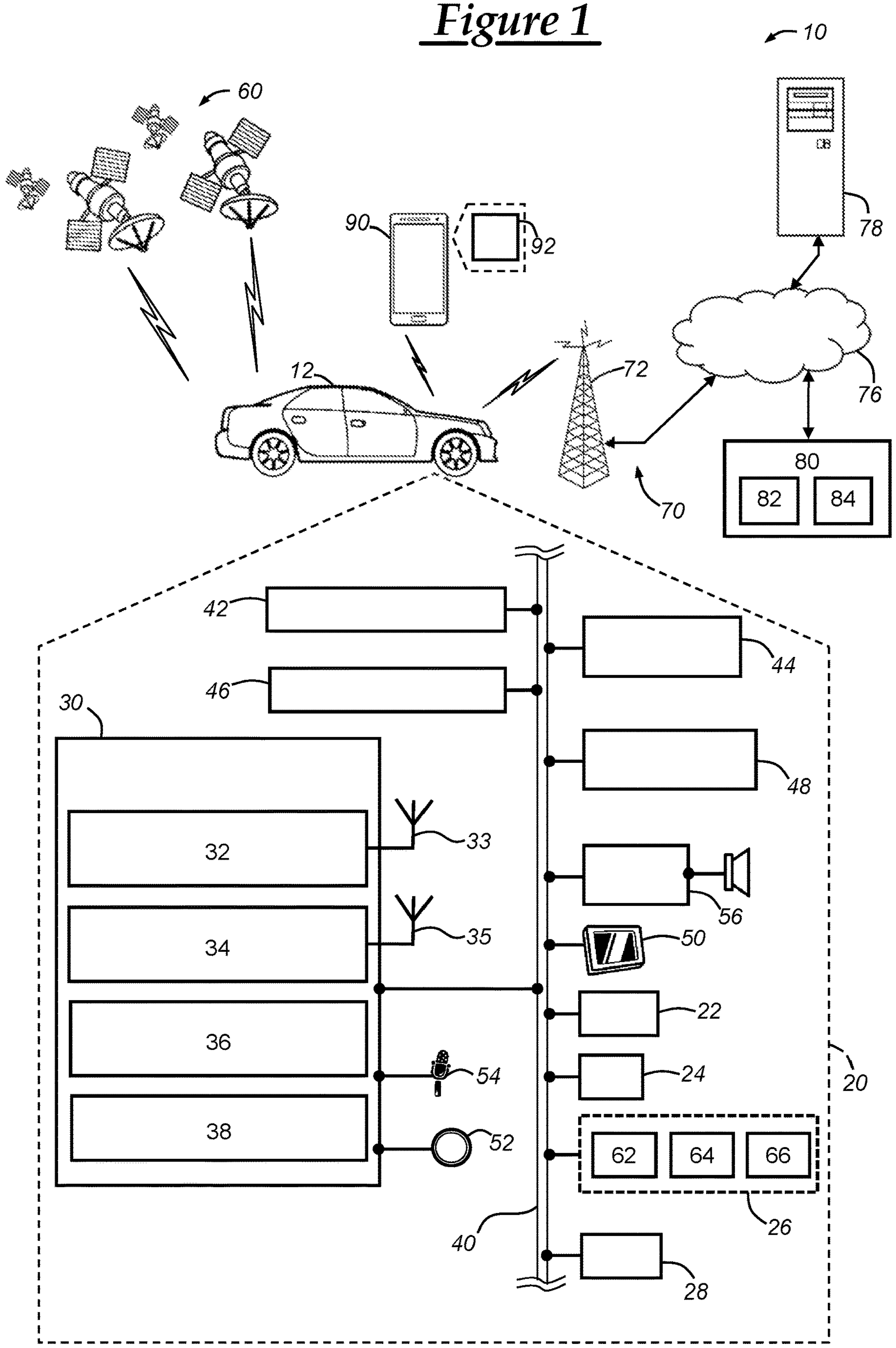
FIG. 1 is a block diagram depicting an embodiment of a communications system that is capable of utilizing the method disclosed herein.

The system and method described below enables advanced prognostics analysis of a vehicle through evaluating vehicle sensor data and, thereafter, providing a warning to a vehicle operator or fleet manager (e.g., fleet owner) based on a prognosis of the vehicle. As those skilled in the art will appreciate, prognosis refers to predicting future vehicle problems or other notable behavior and diagnosis refers to determining a cause of a failure or some other vehicle problem. The description below generally refers to the prognosis of a vehicle; however, it is hereby contemplated that, at least in some embodiments, the system and method can be used to diagnose a vehicle as well. The method can include obtaining vehicle sensor data using a plurality of vehicle sensors, transmitting the vehicle sensor data to a remote facility, evaluating vehicle sensor data from a combination of vehicle sensors through use of a multivariate Gaussian distribution, determining a vehicle subsystem of the vehicle that is experiencing a problem, and carrying out a remedial action for the vehicle subsystem that is experiencing a problem. A multivariate Gaussian distribution model can be developed for vehicle feature combinations, where the vehicle feature combinations include a combination of two or more vehicle features (e.g., vehicle sensors). For example, a vehicle feature combination (with combination size=2) can be used with a bivariate Gaussian distribution model (or other distribution model) to evaluate vehicle feature data. The vehicle feature combination can include a first vehicle feature and a second vehicle feature, wherein each of the vehicle features corresponds to a vehicle sensor. In this way, vehicle prognostics can take into account, not only abnormal sensor values, but abnormal combinations of sensor values from one or more vehicle features. Thus, the vehicle prognostics discussed below can evaluate interrelationships and variances of vehicle sensor data from the first vehicle sensor and vehicle sensor data from the second vehicle sensor.

In addition to using multivariate Gaussian distributions, mixture model techniques can be used to more accurately reflect the distributions among vehicle sensor data of a first vehicle sensor, or among multiple sets of vehicle sensor data from multiple vehicle sensors (or features). For example, for a given vehicle sensor, one or more mixture components (or distribution models) can be used to model the vehicle sensor data of that vehicle sensor. In a like manner, Gaussian mixture models can be applied to multi-dimensional (or multivariate) distributions such that multiple distributions (i.e., mixture components) can be used to model correlations or interrelationships between various vehicle sensor data from a plurality of vehicle sensors. In this way, a multivariate Gaussian mixture model can be used to model correlations or interrelationships between two or more vehicle sensors (e.g., two sensors of a feature combination, all sensor types/models for all vehicles used with the system and/or method) through use of one or more distributions. For example, the multivariate Gaussian mixture model can be used to generate feature combination distribution models for various vehicle sensors (or vehicle features, as defined below), as well as anomaly detection functions that can be used to search for anomalistic relationships among features of a feature combination. Anomaly detection values can be obtained from the anomaly detection functions and, then, can be evaluated in combination with other anomaly detection values of other feature combinations to determine a vehicle subsystem that is experiencing abnormal behavior or problematic behavior. In response to this determination, a corrective or other remedial action can be carried out, and can include reporting the results to the vehicle in the form of a warning message. Furthermore, in some embodiments, this remedial action can include automatically carrying out one or more remedial vehicle functions.

In some embodiments, a plurality of vehicle features can be modeled using multivariate mixture model techniques, including bivariate Gaussian mixture model techniques. For example, a bivariate Gaussian mixture model can be used to model each feature combination (e.g., the combination of a first vehicle feature i and a second vehicle feature j) and, based on the feature combination distribution model(s), an anomaly detection model or function $\text{Anomaly}_{i,j}$ can be derived and then used to determine an overall anomaly detection value or probability $AD_{i,j}$. The anomaly detection value $AD_{i,j}$ can indicate a degree to which an input vector x (e.g., {first feature data, second feature data}) fits or corresponds to the feature combination distribution model(s) used. Thus, for a vehicle that includes N features (or N vehicle sensor data types), then N×N feature combination distribution models may be relevant to that particular vehicle. The particular feature combination distribution models can be included in an overall feature combination distribution model that includes modelling information pertaining to all of the potential features (of all vehicles used with the system and/or method) and all components that are generated. Thus, in some embodiments, an overall covariance matrix can be generated and/or used that includes N×N×M, where N is the number of vehicle sensor data types and M is the number of components. Moreover, each of the feature combinations can include or be associated with one or more feature combination distribution models, each of which is a mixture component. The mixture components or the feature combination distribution models can be associated with a weighting value that is generated using cluster weighting or mixture model weighting techniques. Thus, in this way, an anomaly detection function can be derived and based on the plurality of feature combination distribution models (or mixture components), as well as their attributed weights, to calculate an anomaly detection value $AD_{i,j,k}$ for each distribution or mixture component k. The anomaly detection values $AD_{i,j,k}$ can then be used to obtain an overall anomaly detection value $AD_{i,j}$, which can then be compared to an anomaly detection threshold.

As mentioned above, a variety of vehicle features or vehicle feature combinations can be modeled using multivariate Gaussian mixture model techniques. As used herein, a "vehicle feature" can correspond to vehicle sensor data for a particular dimension of a particular vehicle sensor. And, as used herein, a "feature combination" refers to a combination of two or more vehicle features for use in a multivariate distribution model (e.g., bivariate Gaussian distribution model). For example, a vehicle accelerometer may collect data for an x spatial dimension, a y spatial dimension, and a z spatial dimension. Although a single vehicle sensor may be used (e.g., the accelerometer), the vehicle sensor may include one or more vehicle features (e.g., three in the case of the accelerometer—one each for the x spatial dimension, they spatial dimension, and the z spatial dimension). Thus, in this scenario, nine (9) feature combinations exist including the combination of the first vehicle feature for the x spatial dimension of the accelerometer and a second vehicle feature for they spatial dimension of the accelerometer feature combination. Furthermore, as used herein, a "mixture component" can correspond to a particular distribution, such as a Gaussian distribution, that is used to model the vehicle feature(s) or a part (or cluster) of the vehicle feature(s) (or feature combinations).

In some embodiments, the method can include receiving vehicle data x, parsing the vehicle data x to obtain feature combination data (e.g., first vehicle data $x_i$ for a first vehicle feature i and second vehicle data $x_j$ for a second vehicle feature j), evaluating the feature combination data $\{x_i, x_j\}$ to determine an anomaly detection value $AD_{i,j,k}$ for each mixture component k, determining whether any of the anomaly detection values $AD_{i,j,1}$ to $AD_{i,j,K}$ indicate an anomaly (e.g., via comparing the anomaly detection values $AD_{i,j,1}$ to $AD_{i,j,K}$ to anomaly detection threshold value(s)), and carrying out a responsive action (e.g., a warning, remedial vehicle function) in response to the determining step. The method can be used to process all combinations of a first vehicle feature i and a second vehicle feature j. In this way, when an anomaly is detected, then the vehicle features i and j associated with that anomaly can be determined to be associated with unusual (or anomalistic) vehicle behavior, which may indicate a problem with a particular vehicle subsystem or vehicle system module (VSM). Thus, through analyzing various vehicle sensor data using multivariate Gaussian mixture models, anomalistic variations in correlations between two or more vehicle features can be observed and used to provide insight into the operation of the vehicle. While a particular value of a vehicle feature may not, by itself, indicate an abnormal vehicle behavior, a combination of that particular value and another value of another vehicle feature may indicate abnormal vehicle behavior. However, in some embodiments, a single vehicle feature can be analyzed and/or evaluated to determine whether that single vehicle feature is anomalous, such as when the sensor values for that single vehicle feature fall outside of a range of normal operating values, which can be determined via a training period discussed in more detail below. Moreover, a message can be received from the vehicle electronics at regular intervals, upon the occurrence of some event at the vehicle, or in response to a request for vehicle data from another device, such as a remote facility. These messages can be analyzed to create a historic graph of the vehicle's health over time, which can be presented at a vehicle prognostics application via, for example, a graphical user interface (GUI). The slope (or derivative) of the line representing the vehicle's health over time can be determined and, based on the extent (i.e., steepness) and direction of the slope, a determination can be made as to whether the vehicle's health is degrading and/or whether a vehicle problem may soon occur.

The system and method below describes a specific implementation of certain statistical techniques, including multivariate distribution modelling, mixture modeling, and combinations thereof. These techniques are used to improve computer-related technology of automated vehicle prognostics through enabling computers (or processors) to perform automated statistical modelling and evaluation of vehicle sensor information using the statistical models, as well as to provide a remedial action in response to such evaluation. The statistical models (or feature combination distribution models) that are developed can be used in real-time to evaluate vehicle sensor data from onboard vehicle sensors and, thus, the results of the evaluation can be used to determine a VSM or vehicle subsystem that is experiencing abnormal behavior or problematic behavior. Thereafter, one or more remedial actions can be carried out, such as automatically carrying out a vehicle function at the vehicle based on the results of the evaluation of the vehicle sensor data. Thus, the multivariate distribution modeling and/or mixture modeling techniques can be applied to the technical field of vehicle prognostics to effect an improvement thereof, such as through enabling automated vehicle prognostics and remedial responses to the prognostics to be carried out in real time at a remote location using improved prognostic techniques.

Moreover, in many embodiments, the system and method described below use multivariate distribution modeling techniques to achieve a particular feature combination distribution model for each feature combination. In this way, the system and method provide insight into interrelationships between vehicle sensors (or vehicle features). These interrelationships can be modeled using multivariate distribution modeling techniques and, then, used in real-time to evaluate vehicle feature data (or vehicle sensor data). The evaluation of the vehicle feature data thus provides insight into whether the modeled relationships between features of the feature combination are being followed, or whether the vehicle is experiencing anomalistic behavior with respect to the relationships of the vehicle features of the feature combination. Thus, while evaluation of vehicle feature data of a single vehicle feature may not indicate abnormal behavior, evaluation of the correlations or covariance between two or more vehicle features may indicate abnormal behavior thereby resulting in the improvement of conventional vehicle prognostic techniques.

With reference to FIG. 1, there is shown an operating environment that comprises a communications system 10 and that can be used to implement the method disclosed herein. Communications system 10 generally includes a vehicle 12 with a wireless communications device 30 and other VSMs 22-56, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as for providing peer-to-peer (P2P) vehicle sharing services to a plurality of vehicles and other electronic network computing devices, including vehicle 12 and personal mobile device 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12. In one particular embodiment, the computer 78 can be operated by a service technician and can include a vehicle prognostics application. The vehicle prognostics application can include a graphical user interface (GUI) that can be presented on a display connected or a part of the computer 78. The vehicle prognostics application can present various prognostic/diagnostic information relating to a fleet of vehicles (including the vehicle 12). This prognostic/diagnostic information (referred herein as "prognostic information") can include an overall vehicle health score, vehicle features or sensors reporting anomalistic vehicle sensor readings or behavior (including unique identifiers of the sensors or features), anomaly detection scores (discussed more below), and a vehicle identifier (e.g., vehicle identification number (VIN)). The GUI can also include a portal that can be used to contact the vehicle or an operator of the vehicle. In this way, the service technician can evaluate the vehicle health and then provide support for addressing problems with the vehicle.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers 82, including a vehicle prognostics application (such as the one discussed above). The vehicle backend services facility 80 includes vehicle backend services servers 82 and databases 84, which may be stored on a plurality of memory devices. Also, remote facility 80 can include one or more switches, one or more live advisors, and/or an automated voice response system (VRS), all of which are known in the art. Vehicle backend services facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. In one embodiment, the servers 82 can execute a vehicle backend prognostics application that enables prognosis/diagnosis the vehicle based on a plurality of vehicle features to determine abnormal conditions or operations of the vehicle. In one embodiment, the vehicle prognostics application can be embodied in a computer program and executed using one or more processors of servers 82. This software or computer program may be stored in computer-readable memory such as any of the various types of RAM (random access memory) or ROM (read only memory). For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory that stores some or all of the software needed to carry out the various steps or functions discussed herein. One or more databases at the backend facility 80 can store various information and can include a vehicle prognostics database and other vehicle backend information database(s).

The vehicle prognostics database can include a variety of information that can be used to prognose the operation of a vehicle. The vehicle prognostics database can include vehicle feature data (or vehicle sensor data), vehicle specification information, and vehicle feature modeling data including feature combination distribution models and related data, anomaly detection threshold values, and other data that is pertinent in carrying out the method discussed below. The vehicle feature data can include information received from one or more vehicle features (or sensors) of a particular vehicle. The vehicle feature data can include one or more vehicle sensor values, as well as a time indicator (e.g., timestamp associated with the sensor value), a vehicle identifier (e.g., vehicle identification number (VIN)), etc. The vehicle specification information can include information concerning specifications of the vehicle, such as make, model, model-year, standard features, optional features, aftermarket features, vehicle subsystem and individual vehicle system module (VSM) information (e.g., vehicle sensor and vehicle feature information), vehicle networking information (e.g., networking or user equipment (UE) information, including wireless subscriber information of a telematics unit or other UE, supported networking functionality, device identifiers and/or addresses), and various other information pertaining to a particular vehicle, such as the vehicle 12. It should be appreciated that any or all of the information stored in the vehicle prognostics database can be stored at one or more databases at one or more locations or facilities, and which may be operated and/or managed by one or more associated entities, including an OEM of the vehicles.

Remote facility 80 can use this information to carry out a vehicle operation prognostic process, as well as various other vehicle functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network. And, the servers 82 can be used to provide information stored in the vehicle prognostics database or other databases 84 to various other systems or devices, such as vehicle 12.

The personal short-range wireless communication (SRWC) device 90 is a mobile devices and may include: hardware, software, and/or firmware enabling SRWC as well as other personal (or mobile) device applications. In one embodiment, the personal SRWC device 90 can include a vehicle-device application 92 and a global navigation satellite system (GNSS) receiver. According to various embodiments, the personal SRWC device can include Android™, iOS™, Windows™ Phone, Windows™ Mobile, BlackBerry™, Tizen™, and/or other various operating systems. In one particular embodiment, the personal SRWC device can be a personal cellular SRWC device that includes a cellular chipset and/or cellular connectivity capabilities, as well as SRWC capabilities. Using a cellular chipset, for example, the personal SRWC device can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of SRWC mobile device 90 may comprise: a processor and memory (e.g., non-transitory computer readable medium configured to operate with the processor) for storing the software, firmware, etc. The personal SRWC device's processor and memory may enable various software applications, which may be preinstalled or installed by the user (or manufacturer) (e.g., having a software application or graphical user interface (GUI)).

As mentioned, the personal SRWC device 90 can include a processor and memory. The processor (or processing device) can be any type of device capable of processing electronic instructions including microprocessors, microcontrollers, host processors, controllers, and application specific integrated circuits (ASICs). The processor of the personal SRWC device 90 executes various types of digitally-stored instructions, such as software or firmware programs stored in memory of the personal SRWC device, which enable the device 90 to provide a wide variety of services. The memory of the personal SRWC device may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the personal SRWC device 90 can be used to determine a location of the personal SRWC device. Such devices may communicate with wireless communications device 30 or with each other according to one or more SRWC technologies or wired connections, such as a connection using a Universal Serial Bus (USB) cable. In one embodiment, the personal SRWC device 90 can be used to receive a warning message from the remote facility indicating a particular problem with the vehicle, or a particular VSM or vehicle subsystem that is experiencing a problem.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, body control module or unit (BCM) 24, an engine control module (ECM) 26, other vehicle system modules (VSMs) 28, a wireless communications device 30, battery sensor(s) 42, movement sensor(s) 44, vision sensor(s) 46, exhaust sensor (s) 48, and vehicle-user interfaces 50-56. Some or all of the different vehicle electronics may be connected for communication with each other via one or more communication busses, such as bus 40. Communications bus 40 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle subsystem as part of vehicle electronics 20. As used herein, a vehicle subsystem comprises one or more vehicle system modules (VSMs) that operate together to carry out a particular group of related, electronically-controlled vehicle functions. Some of the VSMs include the GNSS receiver 22, BCM 24, ECM 26, wireless communications device 30, battery sensor(s) 42, movement sensor(s) 44, vision sensor(s) 46, exhaust sensor(s) 48, and vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is preferably connected by communications bus 40 to the other VSMs, as well as to the wireless communications device 30, and can be programmed to run vehicle system and subsystem diagnostic tests. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service. Also, new or updated map data can be downloaded to the GNSS receiver 22 from the remote facility 80 via vehicle communications device 30.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 40. In some embodiments, the BCM 24 may be integrated with or part of a center stack module (CSM) and/or integrated with wireless communications device 30. Or, the BCM may be a separate device that is connected to other VSMs via bus 40. BCM 24 can include a processor and/or memory, which can be similar to processor 36 and memory 38 of wireless communications device 30, as discussed below. BCM 24 may communicate with wireless device 30 and/or one or more vehicle system modules, such as the engine control module (ECM) 26, battery sensor(s) 42, movement sensor(s) 44, vision sensor (s) 46, exhaust sensor(s) 48, audio system 56, or other VSMs 28. BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request to perform a particular operation or a request for vehicle feature data and, in response, the sensor may then send back the requested information. And, the BCM 24 may receive vehicle feature data from VSMs, including battery sensor data or other sensor data from battery sensor(s) 42, movement sensor data from movement sensor 44, spatial or image data from vision sensor(s) 46, exhaust sensor data or other sensor data from exhaust sensor(s) 48, and various other information or data from other VSMs.

Figure 4:
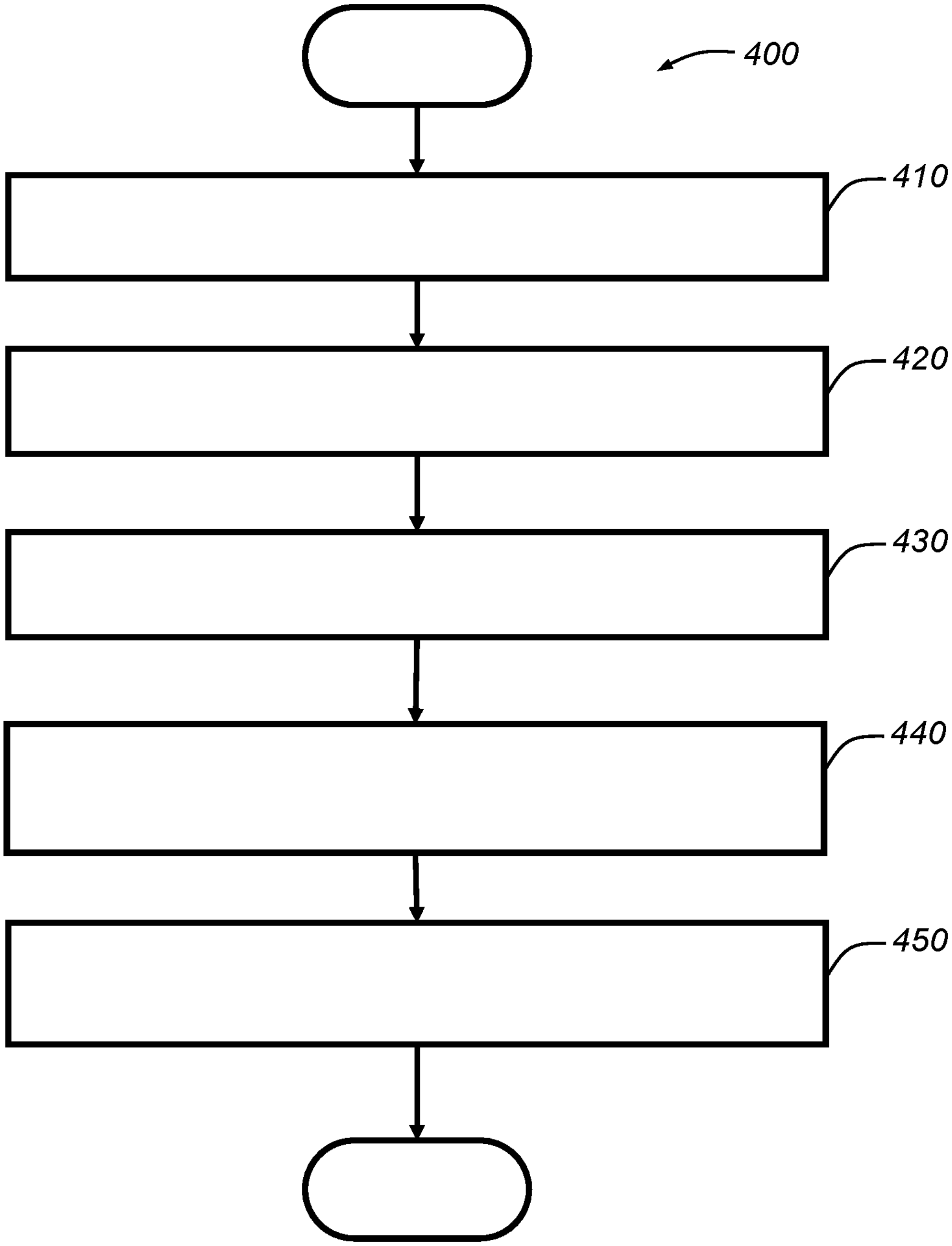
FIG. 4 is a flowchart of another embodiment of a method of carrying out a remedial action in response to a vehicle prognosis.

Additionally, the BCM 24 may provide vehicle state information corresponding to the vehicle state or of certain vehicle components or systems, including the VSMs discussed herein. For example, the BCM may provide the device 30 with information indicating whether the vehicle's ignition is turned on (as received from ECM 26, for example), the gear the vehicle is presently in (i.e. gear state), and/or other information regarding the vehicle. The vehicle feature data and/or vehicle operating state information that is received or obtained at the BCM 24 can be used to monitor certain vehicle operations. This monitoring may be carried out as part of a vehicle monitoring process or prognostics process, such as that discussed below in method 400 (FIG. 4). The information can be sent to the wireless communications device 30 (or other central vehicle computer) automatically upon a request from the device/computer, or automatically upon certain conditions being met, such as when the BCM recognizes abnormal vehicle behavior. The wireless communications device 30 can then send the vehicle feature data (and/or other information) to the remote facility 80 via cellular carrier system 70 and/or land network 76.

Engine control module (ECM) 26 may control various aspects of engine operation such as fuel ignition and ignition timing. ECM 26 is connected to communications bus 40 and may receive operation instructions (or vehicle commands) from BCM 24 or other vehicle system modules, such as wireless communications device 30 or VSMs 28. In one scenario, the ECM 26 may receive a command from the BCM to start the vehicle—i.e., initiate the vehicle ignition or other primary propulsion system (e.g., a battery powered motor). The ECM 26 can also be used to obtain sensor information of the vehicle engine, such as from engine speed sensor 62, engine temperature sensor 64, and engine ignition timing sensor 66. In embodiments when the vehicle is a hybrid or electric vehicle, the ECM 26 can be used to obtain status information regarding the primary mover (including electrical motors and battery information).

The vehicle 12 includes various onboard vehicle sensors 42-48 and 62-66, as well as certain vehicle-user interfaces 50-54 that can be utilized as onboard vehicle sensors. Generally, the sensors 42-54 can use their respective sensor (or sensing device) to obtain vehicle feature data, which can include vehicle sensor values as measured or determined by the onboard vehicle sensor. Other information pertaining to either the operating state of the vehicle (the "vehicle operating state") or the environment of the vehicle (the "vehicle environmental state") can also be obtained or may be included in the vehicle feature data. The vehicle feature data can be sent to other VSMs, such as BCM 24 and the vehicle communications device 30, via communications bus 40. Also, in some embodiments, the vehicle feature data can be sent with metadata, which can include data identifying the sensor (or type of sensor, or vehicle feature) that captured the vehicle feature data, a timestamp (or other time indicator), and/or other data that pertains to the vehicle feature data or vehicle sensor. The "vehicle operating state" refers to a state of the vehicle concerning the operation of the vehicle, which can include the operation of the primary mover (e.g., a vehicle engine, vehicle propulsion motors). Additionally, the vehicle operating state can include the vehicle state concerning mechanical operations of the vehicle—that is, the state of the mechanical operations of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle. The vehicle feature data or sensor information can be used to determine whether the vehicle is experiencing abnormal behavior and particular vehicle sub system(s) or VSM(s) that are experiencing the abnormal behavior.

The battery sensor(s) 42 can include a battery voltage sensor, a battery current sensor, and a battery temperature sensor. The battery voltage sensor can be used to measure the voltage across terminals of a vehicle battery. The battery current sensor can be used to measure current provided by the vehicle battery, and the battery temperature sensor can be used to provide a temperature of the vehicle battery. In one particular embodiment, the battery voltage sensor, the battery current sensor, and the battery temperature sensor can be included in and/or integrated into a single module or sensor unit that is coupled to the battery. The battery sensor(s) 42 can be coupled to various other VSMs directly or via communications bus 40.

The movement sensors 44 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 44 can be mounted on the vehicle in a variety of locations, such as within an interior vehicle cabin, on a front or back bumper of the vehicle, and/or on the hood of the vehicle 12. The movement sensors 44 can be coupled to various other VSMs directly or via communications bus 40. Movement sensor data can be obtained and sent to the other VSMs, including BCM 24 and/or wireless communications device 30.

In one embodiment, the movement sensors can include wheel speed sensors that are each coupled to a wheel and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program. As discussed more below, the electronic stability control program can be embodied in a computer application or program that can be stored on a non-transitory, computer-readable memory (such as that which is included in BCM 24 or memory 38). The electronic stability control program can be executed using a processor of BCM 24 (or processor 36 of the wireless communications device 30) and can use various sensor readings or data from a variety of vehicle sensors including sensor data from sensors 42-54 and 62-66.

Additionally, the movement sensors 44 can include one or more inertial sensors that can be used to obtain sensor information concerning the acceleration and the direction of the acceleration of the vehicle. The inertial sensors can be microelectromechanical systems (MEMS) sensor or accelerometer that obtains inertial information. The inertial sensors can be used to detect collisions based on a detection of a relatively high acceleration. When a collision is detected, information from the inertial sensors used to detect the collision, as well as other information obtained by the inertial sensors, can be sent to the wireless communication module 30 (or other central vehicle computer of the vehicle) and used in determining the quality of care. Additionally, the inertial sensor can be used to detect a high level of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 44 can also include a steering wheel angle sensor that is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in the electronic stability control program that can be executed on a processor of BCM 24 or processor 36.

The movement sensors 44 can include one or more yaw rate sensors that obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

And, additionally, the movement sensors 44 can include a throttle position sensor (TPS) that can be used to determine a position of a throttle device of vehicle 12. For example, the throttle position sensor can be coupled to an electronic throttle body or system that is controlled by an actuator (such as a gas pedal) via a throttle actuation controller. The TPS can measure throttle position in a variety of ways, including through using a pin that rotates according to the throttle position (e.g., the output of the throttle actuation controller) and that reads a voltage through the pin. The voltage through the pin can vary due to the pin's position, which varies the amount of resistance of the circuit and, thus, the voltage. This voltage data (or other data derived therefrom) can be sent to BCM 24, which can use such readings as a part of the electronic stability control program, as well as various other programs or applications. The movement sensors 44 can include various other sensors not explicitly mentioned here, including brake pedal position sensors and other sensors contributing to a change in movement (i.e., a change in direction or propulsion, as indicated by a sensor reading of a vehicle operation or as indicated by receiving an input that (typically) results in a change in direction or propulsion).

Vision sensor(s) 46 can be any type of sensor that obtains visual or spatial information concerning an area within or surrounding the vehicle 12. For example, the vision sensor (s) 46 can be cameras, radars, lidars, etc. The data obtained by the vision sensor(s) 46 may be sent to another vehicle system module (VSM) such as wireless communications device 30 and/or BCM 24 via communications bus 40. In one embodiment, the vision sensor(s) 46 include an electronic digital camera that is powered through use of a vehicle battery. The electronic digital camera may include a memory device and a processing device to store and/or process data that it captures or otherwise obtains, and can be any suitable camera type (e.g., charge coupled device (CCD), complementary metal oxide semiconductor (CMOS), etc.) with any suitable lens.

The vision sensor(s) 46 can be used to capture photographs, videos, and/or other information pertaining to light, which is collectively referred to herein as vision data. In one embodiment, the vision data can be image data, which is vision data that can be represented in a pixel array and can be captured using interlacing or progressive scanning techniques. The image data can be captured at a set or preconfigured scanning or sampling frequency, and may be configured to obtain image data of a particular resolution. Once the image data is obtained through using the vision sensor(s) 46, the image data (or vision data) can be processed and then sent to one or more other VSMs, including the wireless communications devices 30 and/or the BCM 24. The vision sensor(s) 46 can include processing capabilities that enable image processing techniques, including object recognition techniques, to be carried out at the vision sensor(s) 46. Or, in other embodiments, the cameras may send raw or formatted image data to another VSM, such as device 30 (or other central vehicle computer), which can then perform the image processing techniques.

The exhaust sensor(s) 48 can be various sensors that are used to detect or measure characteristics of exhaust gas generated by the vehicle engine. For example, the exhaust sensor(s) 48 can include at least one oxygen sensor (or lambda sensor) that measures the proportional amount of oxygen in the exhaust. Various other gas detectors or gas ionization detectors can be used to measure the content of other elements or molecules, as well as other properties of the exhaust gas. The exhaust sensor data can be sent to one or more other vehicle modules via communications bus 40.

Additionally, the vehicle 12 can include other sensors not explicitly mentioned above, including parking sensors, lane change and/or blind spot sensors, lane assist sensors, ranging sensors (i.e., sensors used to detect the range between the vehicle and another object, such as through use of radar or lidar), tire-pressure sensors, fluid level sensors (including a fuel level sensor), brake pad wear sensors, V2V communication unit (which may be integrated into the wireless communications device 30, as discussed below), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the vehicle monitoring process. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium such as may be implemented using various forms of RAM or ROM, or optical or magnetic medium, or any other electronic computer medium that stores some or all of the software needed to carry out the various external device functions discussed herein. A processor including any or all of these features can also be included in each of plurality of servers 82.

The wireless communications device 30 can thus interface various VSMs of the vehicle 12 with one or more devices external to the vehicle 12. This enables various vehicle operations to be carried out and/or monitored by "extra-vehicle" devices (or non-vehicle devices), including the personal SRWC device 90 and the vehicle backend services facility 80. For example, the wireless communications device 30 can receive sensor data from one or more onboard vehicle sensors 42-54 and 62-66. Thereafter, the vehicle can send this data (or other data derived from or based on this data) to other devices or networks, including the personal SRWC device 90 and the vehicle backend services facility 80. And, in another embodiment, the wireless communications device 30 can be incorporated with or at least connected to a navigation system that includes geographical map information including geographical roadway map data. The navigation system can be communicatively coupled to the GNSS receiver 22 (either directly or via communications bus 40) and can include an on-board geographical map database that stores local geographical map information.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information (e.g., monitoring information) and that can obtain vehicle feature data for use in the method below. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Additionally, the microphone 54 can be used as a decibel (db) noise level monitor (or sensor) that monitors the noise level in the vehicle. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Any one or more of these vehicle-user interfaces that can receive input from a user can be used to receive a driver override request, which is a request to cease operating the one or more VSMs as a part of the immersive media experience. Various other vehicle-user interfaces can also be utilized, as the interfaces of FIG. 1 are only an example of one particular implementation.

Figure 2:
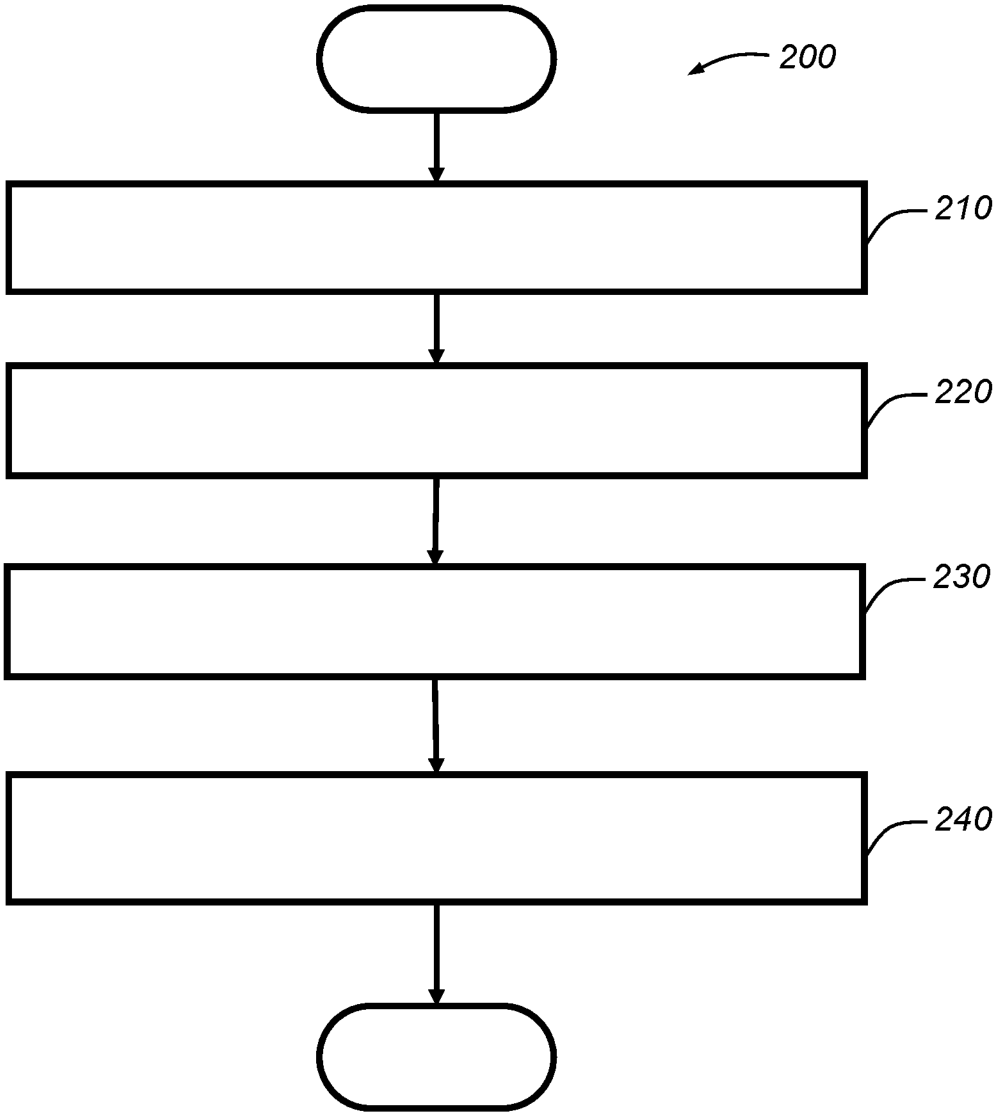
FIG. 2 is a flowchart of an embodiment of a method of carrying out a remedial action in response to a vehicle prognosis.

With reference to FIG. 2, there is shown a method 200 of building a correlation model for use in a vehicle prognostics process. The method 200 can implement a multivariate mixture model that can be used to model correlations between multiple vehicle features using a plurality of mixture components (or distributions). In one embodiment, one or more feature combination distribution model(s) representing correlations (or interrelationships) between two vehicle features can be implemented using a bivariate Gaussian mixture model. The method 200 can be implemented as a computer program that is carried out by a processor, such as a processor at servers 82. Moreover, a network of servers 82 located at a plurality of vehicle backend services facility 80 can be used in conjunction with one another to carry out the method 200. However, various other embodiments exist, as will be apparent from the discussion below in light of the discussion of system 10 provided above.

While the method 200 is discussed with respect to establishing or building a single feature combination mixture model, the method 200 can be used to establish or build a plurality of correlation models that can then be used in the vehicle prognostics process, such as that which is discussed with respect to method 400 (FIG. 4) below. The feature combination mixture model can include one or more mixture components and, in such a case, the feature combination mixture model thus includes one or more feature combination distribution model(s). Thus, in one embodiment, the method can be carried out to form (N×N) feature combination mixture models and, in such a case, the method 200 (or steps thereof) can be carried out at least (N×N) times. Moreover, feature combination mixture models can be established for certain predetermined groups of vehicles, such as a set of feature combination mixture models for each model-year (e.g., 2018 Equinox), for each model (e.g., Equinox), for each model-year of a particular geographical region, or based on another classification or grouping. In this way, N×N feature combination mixture models can be established for each of the members of the predetermined groups.

Method 200 begins with step 210, wherein training data is obtained. The training data can be vehicle telemetry information, such as vehicle feature data or sensor data, that was previously received by the remote facility 80 from a plurality of vehicles. Moreover, the training data can also include vehicle sensor telemetry data, diagnostic trouble codes (DTCs), and metadata concerning the vehicle. The training data can further be divided based on predetermined groups (e.g., model-year) and, in one embodiment, the training data is separated based on the model-year of the vehicles to which the vehicle sensor data pertains. However, in some embodiments, certain training data may concern a particular subsystem or VSM that is the same across numerous, different makes, models, model-years, etc. And, additionally, training data can be gathered from a plurality of different vehicles among a given model of a given model-year so as to cover geographical dispersions of the vehicles, which can provide training data collected from vehicles of varying climates, etc. Moreover, first vehicle feature training data and second vehicle feature training data can be separated out of the training data set. The first vehicle feature training data corresponds to training data for a first vehicle feature i and the second vehicle feature training data corresponds to training data for a second vehicle feature j. Thus, in one scenario, the first vehicle feature training data can be vehicle sensor data relating to the first vehicle feature i for all vehicles of a particular model-year (i.e., a first member of the predetermined group) and the second feature training data can be vehicle sensor data relating to the second vehicle feature j for all vehicles of the particular model-year. Various other sub-groups can be formed as well as used to divide the training data.

As mentioned above, the purpose of forming the correlation models is to model correlations between vehicle features and, thus, the first feature data and the second feature data can be associated with one another based on the vehicle that the data relates to (i.e., the vehicle that obtained the data using the first vehicle feature i (e.g., vehicle sensor)). Thus, in addition to extracting the first feature data and the second feature data, first feature data pertaining to a first vehicle and second feature data pertaining to the first vehicle can be extracted and then used in step 220.

Moreover, in many embodiments, the training data can comprise or consist of data from healthy vehicles, or vehicles that appear to be functioning normally. For example, the databases 84 can hold vehicle feature data pertaining to a plurality of vehicles. This vehicle or the vehicle feature data can be associated with an overall vehicle health score and, when the overall vehicle health score reflects a healthy vehicle, then the associated vehicle feature data can be included as training data. The overall vehicle health score can reflect a healthy vehicle when the overall vehicle health score surpasses a vehicle health threshold value. Through using training data of only healthy vehicles, feature combination mixture models can be developed to reflect feature combination distribution models of healthy vehicles. Thus, the feature combination mixture models can be used to determine whether received vehicle feature data indicates a healthy vehicle. The method 200 then continues to step 220.

Figure 3:
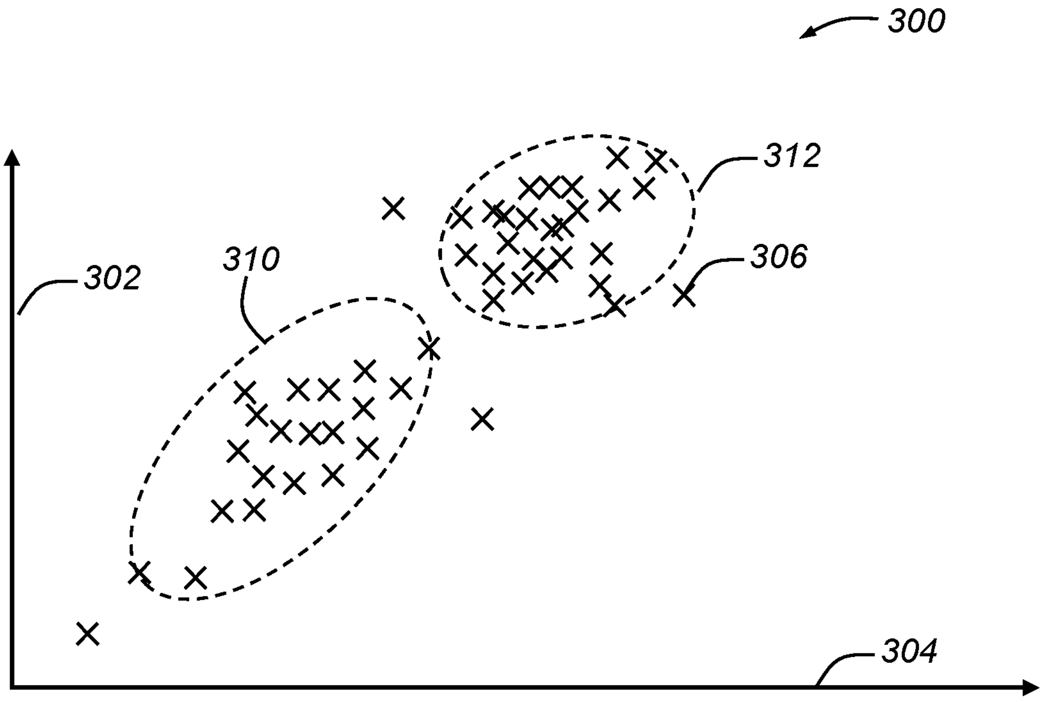
FIG. 3 is a plot of an embodiment of feature combination data.

In step 220, the first feature data and the second feature data are modelled together to form a feature combination mixture model. A feature combination is a combination of two or more vehicle features, such as the combination of the first vehicle feature i and the second vehicle feature j. The number of features used in a feature combination can depend on the nature of the modelling used, such as the number of dimensions used in a multivariate model. For example, where distributions of two features are to be modelled, the number of dimensions (or features) used is 2 and, thus, a bivariate modelling techniques can be used. The feature combination data (e.g., the first feature data and the second feature data when using a bivariate model) can be modelled through a series of feature combination data points that represent the value of a reading of the first feature data and the value of a reading of the second feature data, where such readings are taken from the same vehicle at the same time. For example, as shown in FIG. 3, the first feature data of the first vehicle feature i can be plotted against the second feature data of the second vehicle feature j, where the axis 302 represents the range of values for feature data of the first vehicle feature i and the axis 304 represents the range of values for feature data of the second vehicle feature j. Each of the first-second feature data points 306 can represent the value of the first vehicle feature i (as measure with respect to axis 302) and the value of the second vehicle feature j (as measure with respect to axis 304) taken at a time t. Although each feature combination data points 306 includes sensor data from a particular vehicle taken at a particular time t, each of the feature combination data points 306 do not need to be (and, in many embodiments, should not be) taken from the same vehicle or taken at the same time t.

The plurality of feature combination data points 306 can then be modelled using a normal (or Gaussian) distribution model, or other models known to those skilled in the art. For example, in one embodiment, a type of model can be determined from a set of models and based on the particular feature combination data. Various types of models can be used, including a Gaussian (or normal) distribution model, a Poisson model, a log normal model, a student's t model, a chi-squared model, other binomial models, exponential models (e.g., Weibull models), Bernoulli models, other uniform models, etc. After the type of model is selected, then the model can be applied to the feature combination data points 306.

When modelling the feature combination data, application of the selected model to the feature combination data points 306 can include determining a mean value and a variance (and/or standard deviation). In many embodiments, a mean value can be calculated for each dimension; for example, when using two dimensions for bivariate modelling, a mean value for the first feature data of the first vehicle feature i can be determined, as well as a mean value for the second feature data of the second vehicle feature j. Moreover, when more than one mixture component is used for a given feature combination, a mean value for each mixture component of each dimension (e.g., vehicle feature) can be determined. As an example, the plot 300 includes two dimensions and two mixture components and, thus, four mean values can be determined, where the four values correspond to either: mixture component 310 and feature i; mixture component 312 and feature i; mixture component 310 and feature j; or mixture component 312 and feature j.

As mentioned above, multiple mixture components (or distributions) can be used to model feature data of a particular vehicle feature combination and can be used to make up a feature combination mixture model. For example, plot 300 depicts a feature combination mixture model that includes two mixture components 310, 312, each of which is based on a determined or selected distribution model. The distribution model can include feature combination distribution model parameters such as mean μk, variance $\sigma_k^2$, standard deviation $\sigma_k$, a covariance matrix $\Sigma_k$ (or $\sigma_{i,j,k}$), and a correlation value $\rho_k$, among others. Further, each mixture component can be developed based on the number of dimensions (or number of vehicle features) being compared; for example, a mixture component 310 can be developed for each particular vehicle feature combination, which, when using bivariate Gaussian mixture model techniques, includes two features (first vehicle feature i and second vehicle feature j). Moreover, in some embodiments, the number of mixture components to be used for each particular vehicle feature combination can depend on the particular distribution of values among the particular vehicle feature combination. For example, some feature combination data may only need a single mixture component due to a relatively high "goodness of fit," which can be determined using regression analysis techniques. In a particular embodiment, the number of mixture components for a given feature combination can be iteratively increased until the average (or overall) "goodness of fit" of the mixture components to the feature combination data exceeds above a particular threshold (or until some other stopping condition). Various clustering and/or mixture model techniques can be used to form a plurality of data groups, each of which corresponds to a mixture component. Such clustering and/or mixture model techniques can include, for example, k-means clustering, Gaussian mixture models, other mixture models, and/or hierarchical clustering.

In one embodiment, all of the feature data pertaining to all features of all vehicles of the system 10 can be modelled together to obtain an overall covariance matrix using techniques described herein and/or known to those in the art. This covariance matrix can thus represent information pertaining to all combinations of two features i and j, and can also include a plurality of mixture components. Once the vehicle feature data for the feature combination is extracted and the feature combination data is modelled, then the method 200 continues to step 230.

In step 230, an anomaly detection function can be determined for each feature combination based on the feature combination model. An anomaly detection function $\text{Anomaly}_{i,j}$ is the anomaly detection function for the feature combination of the first vehicle feature i and the second vehicle feature j. The anomaly detection function $\text{Anomaly}_{i,j}$ takes a vector x as an input, where x=first feature data, second feature data and returns an anomaly detection value $AD_{i,j}$, where the anomaly detection value $AD_{i,j}$ indicates a magnitude of the correlation of the vector x to the feature combination model. For example, the overall covariance matrix can be converted to a Cholesky matrix using Cholesky decomposition on the overall covariance matrix. Then, a first array can be solved for such that the Cholesky matrix multiplied by the array results in a second array where the n-th entry in that other array is the difference between the n-th feature and the mean of the n-th feature. Thereafter, the squares of the elements of that array are calculated and summed together. This summed result is then added to the value of N×log(2×π)+determinant, where N is the total number of features (i.e., not just for a particular vehicle, but for all vehicles to which the method is being applied or can be used), and the determinant is the determinant of the Cholesky matrix. This entire result can then be multiplied by −0.5 to give an overall score for all of the features in a given measurement (e.g., a given telemetry message). Thereafter, to extract which feature and/or feature combination (or pair of features) is likely causing an issue, each feature combination can be iterated through and the overall covariance matrix can be split apart so that it is left with only those features of the feature combination.

In another embodiment, the anomaly detection function $\text{Anomaly}_{i,j}$ can be a bivariate probability density function of the vector $[x_i, x_j]$, where $x_i$ is the first feature data of the first vehicle feature i and $x_j$ is the second feature data of the second vehicle feature j. In one particular example, the following equation can be used to represent the anomaly detection function $Anomaly_{i,j}$:

$$Anomaly_{i,j} = \frac{1}{2\pi\sigma_i\sigma_j\sqrt{1-\rho^2}}\exp\left(-\frac{1}{2(1-\rho^2)}\left[\frac{(x_i-\mu_i)^2}{\sigma_i^2}+\frac{(x_j-\mu_j)^2}{\sigma_j^2}-\frac{2\rho(x_i-\mu_i)(x_j-\mu_j)}{\sigma_i\sigma_j}\right]\right) \quad \text{(Equation 1)}$$

where $x_i$ is the first feature data of the first vehicle feature i, $x_j$ is the second feature data of the second vehicle feature j, $\mu_i$ is the mean of the first vehicle feature data, $\mu_j$ is the mean of the second vehicle feature data, $\sigma_i$ is the variance among the first vehicle data, $\sigma_j$ is the variance among the first vehicle data, and $\rho$ is correlation parameter, such as the product moment correlation coefficient or the correlation coefficient.

Moreover, the anomaly detection function $Anomaly_{i,j}$ can take into account the models used for the mixture components and, thus, can be represented by the anomaly detection function $Anomaly_{i,j,k}$, where k represents a given mixture component. In one embodiment, a weighting factor $\pi_k$ for each mixture component can also be used. For example, an anomaly detection function $Anomaly_{i,j,k}$, such as the anomaly detection function of Equation 1 above, can be used to calculate an anomaly detection value $AD_{i,j,k}$ for each mixture component k. Then, each of the anomaly detection values can be multiplied by the corresponding weighting factor (i.e., anomaly detection value $AD_{i,j,k}\times\pi_k$) and added to each other to obtain the overall anomaly detection value $AD_{i,j}$ (e.g., $AD_{i,j}=\Sigma_{k=1}^{K_{i,j}}AD_{i,j,k}\times\pi_k$, where there are $K_{i,j}$ mixture components for the feature combination of i,j).

In other embodiments, the anomaly detection function can be a likelihood function that is based on the feature combination distribution models (e.g., the bivariate Gaussian mixture models used to model the feature combination data). In one particular embodiment, a log likelihood function or a negative log likelihood function can be used as the anomaly detection function $Anomaly_{i,j}$. Once the anomaly detection function is determined, then the method 200 continues to step 240.

In step 240, the anomaly detection information can be stored in a database. The anomaly detection information can include the anomaly detection function $Anomaly_{i,j}$, feature combination distribution model parameters, and other information or values used in the anomaly detection process discussed below. This information can be stored in the vehicle prognostics database that is a part of the databases 84 of remote facility 80. Moreover, many instances of the vehicle prognostics database can be maintained at the remote facility 80 and/or at other remote facilities. All instances of the vehicle prognostics database can thus be updated with the anomaly detection function and other associated values or information. Also, information pertaining to the feature combination distribution models or mixture components k can be stored in the vehicle prognostics database at the remote facility 80, including feature combination distribution model parameters (e.g., mean $\mu_k$, variance $\sigma_k^2$, standard deviation $\sigma_k$, a covariance matrix $\Sigma_k$ (or $\sigma_{i,j,k}$), and a correlation value $\rho_k$). The method 200 then ends.

As mentioned above, the method 200 can be carried out for each feature combination such that an anomaly detection function is determined for all of the combinations of vehicle features (with combination size=2 for bivariate modelling). These models can then be used with the method 400 (FIG. 4) discussed below.

With reference to FIG. 4, there is shown a method 400 of carrying out a remedial action in response to a vehicle prognosis. The method 400 can use the anomaly detection information that was generated and stored in the vehicle prognostics database pursuant to method 200 (FIG. 2). In one embodiment, the method 400 can include obtaining vehicle feature data x from the vehicle, extracting feature combination data for each feature combination, determining whether an anomaly exists, and carrying out a remedial action (e.g., a warning, or a remedial vehicle function) when it is determined that an anomaly exists. The method 400 can be implemented as a computer program that is carried out by a processor, such as a processor at servers 82. Moreover, a network of servers 82 located at a plurality of vehicle backend services facility 80 can be used in conjunction with one another to carry out the method 400. In another embodiment, the method 400 can be implemented in vehicle electronics, such as via a computer program stored on memory 38 and executable by the processor 36. However, various other embodiments exist, as will be apparent from the discussion below in light of the discussion of system 10 provided above.

Method 400 begins with step 410, wherein vehicle feature data is received from a vehicle. The vehicle feature data can include vehicle sensor data from a plurality of vehicle sensors, including onboard vehicle sensors 42-48 and 62-66. In some embodiments, the vehicle feature data can be received periodically, in response to a trigger at the vehicle (e.g., in response to a new diagnostic trouble code (DTC)), or in response to a request from the remote facility 80 (or vehicle prognostics application, which can be carried out by servers 82). Once the vehicle feature data is received, a vehicle overall health prognostics process can be carried out to determine an overall health rating or score of the vehicle. This vehicle overall health prognostics process can include inputting the vehicle feature data (or a portion thereof) into a vehicle overall health prognostics function that returns an overall health rating of the vehicle. This overall health rating can then be compared to an overall vehicle health threshold value and, in response to the overall health rating surpassing the overall vehicle health threshold value, then the method 400 can continue to step 420; otherwise, the method 400 proceeds back to the beginning of method 400 where the method 400 waits for vehicle feature data to be received. In embodiments where lower overall vehicle health values indicate better overall vehicle health, then surpassing the overall vehicle health threshold value means exceeding the overall vehicle health threshold value and, embodiments where higher overall vehicle health values indicate better overall vehicle health, then surpassing the overall vehicle health threshold value means falling below the overall vehicle health threshold value.

In step 420, feature combination data is extracted from the received vehicle feature data. As mentioned above, the feature combination data represents the data of the vehicle feature data that pertains to the vehicle features i and j of the feature combination (where combination size=2 and/or where bivariate models are used). The feature combination data can be extracted and pre-processed so that the first feature data $x_i$ and the second feature data $x_j$ is in an appropriate form for use with the anomaly detection function $Anomaly_{i,j}$, which will be applied in step 430. In many embodiments, the VSM or vehicle subsystem that is causing the overall vehicle health value to indicate poor or reduced health is not known and, thus, the steps 420 through 440 can be carried out for each feature combination of the vehicle feature data. The method 400 continues to step 430.

In step 430, an anomaly detection value (or score) is determined for the feature combination and based on the feature combination data that was extracted. An anomaly detection value $AD_{i,j}$ can be determined through use of the anomaly detection function $Anomaly_{i,j}$ that was generated above as a part of the method 200 (FIG. 2). In such a case, the feature combination data $\{x_i, x_j\}$ can be inputted into the anomaly detection function $Anomaly_{i,j}$ to obtain the anomaly detection value $AD_{i,j}$. The anomaly detection value $AD_{i,j}$ can indicate a probability or likelihood that the feature combination data occurs as a part of the feature combination distribution model(s). In one embodiment, the feature combination i,j may be associated with a plurality of feature combination distribution models and, thus, the feature combination data can be used with these feature combination distribution models to obtain anomaly detection values $AD_{i,j,k}$ for each feature combination distribution model or mixture component k. In some embodiments, the anomaly detection function $Anomaly_{i,j}$ can be unique to each vehicle model-year (or other classification) and, thus, the model-year of the vehicle can be determined first so that the proper anomaly detection function $Anomaly_{i,j}$ can be recalled from the vehicle prognostics database. After the anomaly detection value $AD_{i,j}$ is obtained, the method 400 proceeds to step 440.

In step 440, a vehicle subsystem (e.g., a particular VSM) is determined to be causing or associated with abnormal vehicle behavior. In one embodiment, the anomaly detection values $AD_{i,j}$ for all of the feature combinations can be evaluated to determine which vehicle subsystem is causing or associated with abnormal vehicle behavior. For example, the anomaly detection values $AD_{i,j}$ can be sorted from most anomalous to least anomalous, which can correspond to sorting the anomaly detection values $AD_{i,j}$ such that the anomaly detection values $AD_{i,j}$ associated with a higher likelihood of not falling within the feature combination mixture model are nearest the top of the list. Then, the feature combinations associated with the top anomaly detection values $AD_{i,j}$ (e.g., the top ten feature combinations associated with the top ten anomaly detection values $AD_{i,j}$) can be selected to be evaluated, as discussed below. Moreover, the selected feature combinations can be analyzed to determine if a particular vehicle feature is a part of numerous selected feature combinations. For example, a first selected feature combination can include a battery voltage sensor of battery sensor(s) 42 (feature 1) and the engine speed sensor 62 (feature 2), a second selected feature combination can include a battery voltage sensor (feature 1) and the engine temperature sensor 64 (feature 3), and a third selected feature combination can include the ignition timing sensor 66 (feature 2) and battery voltage sensor (feature 1). Since feature 1 (the battery voltage sensor) appears as a part of numerous selected feature combinations, then it can be determined that feature 1 (the battery voltage sensor) (or the battery or associated vehicle subsystem) is experiencing a problem or unusual behavior.

In yet another embodiment, each anomaly detection value is compared to an anomaly detection threshold value. For example, the anomaly detection value $AD_{i,j}$ is compared to an anomaly detection threshold value $T_{i,j}$ to determine whether the feature combination data indicates (or likely indicates) a problem with the vehicle. In one embodiment, the anomaly detection threshold value $T_{i,j}$ can be a different value for each feature combination i,j, or in other embodiments, can be a single value used for all feature combinations. The anomaly detection threshold value $T_{i,j}$ can be stored in the vehicle prognostics database, or in another database or memory device located at the remote facility 80. All of the feature combinations associated with (or corresponding to) an anomaly detection value that exceeds the respective anomaly detection threshold value can be selected to be evaluated, as discussed below.

Moreover, in other embodiments, vehicle feature data of a single vehicle feature can be compared to a distribution model for that single vehicle feature. In such an embodiment, multivariate techniques may not be used. In one embodiment, the vehicle feature data of the single vehicle feature can be analyzed with a distribution model for that particular single vehicle feature and the analysis can include determining whether vehicle feature data for that feature falls within normal or expected ranges as determined when constructing the models. Moreover, the analysis can include using a likelihood function, such as any of those discussed herein or known to those skilled in the art, and, moreover, the resulting likelihood value can be compared to a threshold value, which can indicate that a problem with that single vehicle feature exists or likely exists. In some embodiments, this technique can be carried out in response to evaluating feature combinations and determining that a problem associated with the single vehicle feature may exist, which can be determined based on the single vehicle feature being prominent in the top (or selected) anomalistic feature combinations, as discussed more below.

In many embodiments, one or more selected feature combinations can be evaluated to determine which vehicle subsystem is causing or associated with abnormal vehicle behavior, which can correspond to which VSM or vehicle subsystem generally is the cause of the low overall vehicle health score (step 410). The selected feature combinations can be evaluated using a variety of different techniques, including automated techniques and manual techniques. In one embodiment, the selected feature combinations and the associated anomaly detection values $AD_{i,j}$ can be presented to a service technician via a graphical user interface (GUI). The GUI can be executed and presented at the remote facility 80 or computer 78. The GUI can include graphical representations of the vehicle's health over time such as through graphing the overall vehicle health score over time. Additionally, the GUI can include graphical or other visual representations of the anomaly detection values $AD_{i,j}$ (associated with the selected feature combinations) and/or the first feature data $x_i$ and the second feature data $x_j$, such as a graph showing the values of the feature data over time. Additionally, the selected or top feature combinations can be displayed along with the associated anomaly detection values $AD_{i,j}$. The selected feature combinations can be identified in the GUI based on a unique identifier (i.e., an identifier that uniquely identifies the vehicle feature and/or the associated vehicle sensor). This information can be used to indicate to the service technician which combinations of first feature data $x_i$ and the second feature data $x_j$ are anomalistic, which can then be used as a basis in determining which VSM or vehicle subsystem is experiencing abnormal or problematic behavior.

In another embodiment, the anomaly detection values $AD_{i,j}$ (associated with the selected feature combinations) and other information (such as the identifiers of the vehicle feature or vehicle sensor) can be evaluated automatically. For example, the evaluation can include a set of rules embodied in a computer program that evaluate the anomaly detection values $AD_{i,j}$ (associated with the selected feature combinations), as well as the selected feature combinations to determine a vehicle subsystem generally, or VSM particularly, that is experiencing a problem. The rules can include, for example, determining a number of feature combinations that are associated with an anomaly detection value $AD_{i,j}$ that exceeds an anomaly detection threshold value, determining a VSM or vehicle subsystem that the vehicle features of the selected feature combinations pertain to the most, and evaluating the prominence of a particular VSM or vehicle subsystem among the selected feature combinations (e.g., the degree to which the vehicle features of the selected feature combinations pertain to a particular VSM or vehicle subsystem).

Moreover, in some embodiments, the anomaly detection values $AD_{i,j}$ (associated with the selected feature combinations) and other information (such as the identifiers of the vehicle feature or vehicle sensor) can be evaluated to determine a magnitude of the problem or abnormal behavior, such as an amount of potential harm. In some embodiments, the amount of potential harm is based on the anomaly detection value(s) $AD_{i,j}$ (associated with the selected feature combinations) and/or a potential amount of harm that can be caused by such a problem. The method 400 continues to step 450.

In step 450, a remedial action is carried out in response to the determination of which vehicle subsystem is causing or associated with the abnormal behavior. The remedial action can include generating and/or sending a warning message to the vehicle 12. The warning message can be received by the vehicle 12 and then presented to a vehicle operator or vehicle user (e.g., passenger) using one or more vehicle user interfaces, such as display 50 or audio system 56. In one embodiment, the warning message can be presented to the vehicle user informing the user that the vehicle 12 is experiencing a problem with a particular vehicle subsystem (as determined in step 440). Additionally, or alternatively, the warning message can include one or more recommended actions that the vehicle user is recommended to take to address the problem or abnormal behavior of the vehicle.

In other embodiments, the remedial action can include generating and sending a vehicle command to the vehicle 12. The vehicle command can instruct the vehicle to carry out a particular vehicle function, such as a vehicle function that is designed or tailored in addressing a particular problem or a particular VSM or vehicle subsystem generally. In one embodiment, the vehicle command can be automatically carried out at the vehicle when the vehicle command is received at the vehicle or at an appropriate time. For example, the determination of step 440 may indicate a problem with the vehicle ignition and may be associated with a significant driver inconvenience due to, for example, the vehicle ignition not starting the engine when the ignition is properly actuated. In such a scenario, the remote facility 80 may issue a vehicle command to the vehicle 12 that automatically causes the vehicle 12 to pull over to the side of the road (e.g., using autonomous functionality) and turn off the vehicle ignition (or primary mover) as well as presenting a warning message or indicator. Various other vehicle functions, including any of those discussed above, can be carried out automatically in response to receiving the vehicle command. Additionally, in some embodiments, the vehicle command may not cause the vehicle to carry out a vehicle function, but may enable or disable a particular vehicle function or set of vehicle functions.

The vehicle 12 can send a response message back to the remote facility 80 in response to receiving the remedial message (e.g., the warning message, the vehicle command). In some embodiments, the response message can indicate whether the vehicle command was received. And, in some embodiments where the selected feature combinations or vehicle features are indicated in the remedial message received by the vehicle 12, the response message can include vehicle feature data, such as vehicle feature data pertaining to those vehicle features of the selected feature combinations, or vehicle feature data of vehicle features whose feature data is requested by the remote facility 80. This newly obtained vehicle feature data can then be received by the remote facility 80 and then used to evaluate or prognose/diagnose the vehicle further. The method 400 then ends.

In one embodiment, the method 200, the method 400, and/or parts thereof can be implemented in a computer program (or "application") embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (e.g., memory at servers 82, memory 38 of the vehicle 12), which can be non-transitory and can include one or more storage devices, articles of manufacture, or the like. In one embodiment, the program(s) can be embodied on a vehicle and used locally by the vehicle to detect anomalous vehicle activity. Exemplary non-transitory computer readable media include any different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory that stores some or all of the software needed to carry out the various steps or functions discussed herein. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of carrying out a remedial action in response to a vehicle prognosis, the method comprising:
- receiving vehicle feature data from a vehicle;
- extracting a plurality of feature combination data from the vehicle feature data, wherein each of the feature combination data pertains to a feature combination, wherein each of the feature combinations includes two or more vehicle features;
- for each extracted feature combination data, then:
  - evaluating the extracted feature combination data using an anomaly detection function configured particularly for the feature combination, wherein the anomaly detection function is based on a multivariate distribution mixture model; and
  - obtaining an anomaly detection score for each extracted feature combination based on the evaluating step;
- determining a vehicle subsystem that comprises a portion of vehicle electronics installed on the vehicle and that is likely experiencing a problem or unusual behavior based on the anomaly detection scores; and
- carrying out a remedial action in response to the determining step.

2. The method of claim 1, wherein the vehicle feature data is vehicle sensor data, and wherein the vehicle feature data is obtained at the vehicle through use of a plurality of onboard vehicle sensors.

3. The method of claim 2, wherein the onboard vehicle sensors are connected to a wireless communications device via a communications bus, and wherein the wireless communications device is used to send the vehicle feature data to a remote facility.

4. The method of claim 2, further comprising the step of generating a plurality of multivariate mixture models for each possible feature combination of a particular class of vehicles, wherein the multivariate mixture model used in the evaluating step is one of the plurality of multivariate mixture models, and wherein the vehicle is included in the particular class of vehicles.

5. The method of claim 1, wherein the multivariate mixture model is a bivariate Gaussian mixture model that includes a plurality of mixture components.

6. The method of claim 1, wherein each of the anomaly detection functions are based on a different multivariate mixture model, wherein each of the different multivariate mixture models are generated for a particular feature combination.

7. The method of claim 6, wherein a first one of the plurality of feature combinations includes two vehicle features and wherein the first feature combination is associated with a bivariate Gaussian mixture model.

8. The method of claim 1, wherein the remedial action includes sending a warning message to the vehicle.

9. The method of claim 1, wherein the remedial action includes sending a vehicle command to the vehicle that causes the vehicle to automatically carry out a vehicle function pursuant to the vehicle command.

10. A method of carrying out a remedial action in response to a vehicle prognosis, the method comprising:
- receiving vehicle feature data from a vehicle, wherein the vehicle feature data includes data for a plurality of vehicle features, and wherein each of the vehicle features are associated with an onboard vehicle sensor;
- extracting a plurality of feature combination data from the vehicle feature data, wherein each of the feature combination data includes data pertaining to two or more vehicle features;
- for each extracted feature combination data, obtaining an anomaly detection score for each extracted feature combination based on the evaluating step, wherein the anomaly detection scores are each determined by:
  - obtaining an anomaly detection function for a given feature combination, wherein the anomaly detection function is based on a multivariate distribution model that is specifically generated for the feature combination; and
  - calculating the anomaly detection score based on the anomaly detection function and the extracted feature combination data;
- determining a vehicle subsystem that comprises a portion of vehicle electronics installed on the vehicle and that is likely experiencing a problem or unusual behavior based on the anomaly detection scores; and
- carrying out a remedial action in response to the determining step.

11. The method of claim 10, further comprising the step of generating the anomaly detection function.

12. The method of claim 11, wherein the generating step includes modelling a set of training data for each feature combination of a particular type of vehicle, wherein the modelling includes using a multivariate Gaussian mixture model to obtain a feature combination mixture model that includes one or more mixture components.

13. The method of claim 10, wherein the anomaly detection function is a negative log likelihood function.

14. The method of claim 13, wherein the determining step is carried out based on selecting one or more feature combinations that are associated with top anomaly detection scores.

15. The method of claim 14, wherein one or more vehicle features included in the one or more selected feature combinations are analyzed to determine which vehicle subsystem is experiencing or is likely experiencing abnormal behavior or problematic behavior.

16. The method of claim 10, wherein the remedial action is particularly tailored for the vehicle subsystem.

17. A remote vehicle prognosis and remediation system, comprising:
- a server that includes a processor and computer-readable memory, the computer-readable memory storing a computer program; and
- a vehicle prognostics database that stores vehicle telemetry information including a plurality of anomaly detection functions;
- wherein the computer program, when executed by the processor, causes the server to:

receive vehicle feature data from a vehicle;

extract a plurality of feature combination data from the vehicle feature data, wherein each of the feature combination data pertains to a feature combination, wherein each of the feature combinations includes two or more vehicle features;

for each extracted feature combination data, then:

evaluate the extracted feature combination data using an anomaly detection function configured particularly for the feature combination, wherein the anomaly detection function is based on a multivariate mixture model; and obtain an anomaly detection score for each extracted feature combination based on the evaluating step;

determine a vehicle subsystem that comprises a portion of vehicle electronics installed on the vehicle and that is likely experiencing a problem or unusual behavior based on the anomaly detection scores; and carry out a remedial action in response to the determining step.

* * * * *